(12) United States Patent
Choi et al.

(10) Patent No.: US 10,291,079 B2
(45) Date of Patent: May 14, 2019

(54) WIRELESS CHARGING SUBSTRATE AND DEVICE

(71) Applicant: LG INNOTEK CO., LTD., Seoul (KR)

(72) Inventors: Man Hue Choi, Seoul (KR); Hyun Gyu Park, Seoul (KR); Seok Bae, Seoul (KR); Sang Won Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/115,520

(22) PCT Filed: Jan. 28, 2015

(86) PCT No.: PCT/KR2015/000891
§ 371 (c)(1),
(2) Date: Jul. 29, 2016

(87) PCT Pub. No.: WO2015/115789
PCT Pub. Date: Aug. 6, 2015

(65) Prior Publication Data
US 2017/0179753 A1     Jun. 22, 2017

(30) Foreign Application Priority Data

Jan. 29, 2014  (KR) .................. 10-2014-0010993

(51) Int. Cl.
*H02J 7/00*   (2006.01)
*H02J 50/70*  (2016.01)
(Continued)

(52) U.S. Cl.
CPC .............. *H02J 50/70* (2016.02); *H01F 27/22* (2013.01); *H01F 27/2804* (2013.01);
(Continued)

(58) Field of Classification Search
USPC ........................................... 320/108
See application file for complete search history.

(56) References Cited

U.S. PATENT DOCUMENTS

| 2008/0197956 A1 | 8/2008 | Hasegawa et al. |
| 2009/0057703 A1* | 3/2009 | Choi ................. H01L 33/22 |
| | | 257/98 |

(Continued)

FOREIGN PATENT DOCUMENTS

| EP | 2620960 A1 | 7/2013 |
| JP | 2006129605 A | 5/2006 |

(Continued)

OTHER PUBLICATIONS

International Search Report in International Application No. PCT/KR2015/000891, filed Jan. 28, 2015.

(Continued)

*Primary Examiner* — Samuel Berhanu
(74) *Attorney, Agent, or Firm* — Saliwanchik, Lloyd & Eisenschenk

(57) ABSTRACT

Provided is a wireless charging board including: a coil pattern; a soft magnetic layer having one side on which the coil pattern is disposed; and a heat dissipation layer disposed on the other side of the soft magnetic layer and including a first uneven pattern portion.

20 Claims, 3 Drawing Sheets

(51) Int. Cl.
  *H02J 50/10* (2016.01)
  *H02J 7/02* (2016.01)
  *H01F 38/14* (2006.01)
  *H01F 27/22* (2006.01)
  *H01F 27/36* (2006.01)
  *H01F 27/28* (2006.01)

(52) U.S. Cl.
  CPC ....... *H01F 27/2876* (2013.01); *H01F 27/365* (2013.01); *H01F 38/14* (2013.01); *H02J 7/0042* (2013.01); *H02J 7/025* (2013.01); *H02J 7/027* (2013.01); *H02J 50/10* (2016.02)

(56) References Cited

U.S. PATENT DOCUMENTS

2013/0277833 A1* 10/2013 Baek .................. H01L 24/16
                                                    257/737

2013/0285604 A1* 10/2013 Partovi ................ H02J 7/0042
                                                    320/108
2014/0002228 A1    1/2014 Hatanaka et al.

FOREIGN PATENT DOCUMENTS

| JP | 2009027025 A | 2/2009 |
| JP | 2010245323 A | 10/2010 |
| JP | 2010245407 A | 10/2010 |
| JP | 2012186472 A | 9/2012 |
| JP | 2012204440 A | 10/2012 |
| JP | 2014007813 A | 1/2014 |
| KR | 101298660 B1 | 8/2013 |

OTHER PUBLICATIONS

Supplementary European Search Report dated Jan. 23, 2017 in European Application No. 15742924.2.

* cited by examiner

WIRELESS CHARGING SUBSTRATE AND DEVICE

TECHNICAL FIELD

Embodiments of the present invention relate to a wireless charging board and a device.

BACKGROUND ART

Near field communication (NFC) is one radio frequency identification (RFID) technology and is a smart card type non-contact communication technology which uses a frequency band of 13.56 MHz. Wireless power conversion (WPC) is a wireless charging technology and is a non-contact charging technology in which a battery is charged using magnetic coupling without electrical contact at a short distance.

NFC has received attention as a next-generation near communication technology because it makes wireless communications between electronic devices possible with low power at a short distance and has a relatively excellent security due to a short communication distance and a low price. Also, NFC has advantages of having bidirectionality compared to smart cards, a large storage memory space, and a wide applicable service range. WPC has advantages of charging a battery using magnetic coupling without additional electrical contact and being applicable to charge a battery in various fields.

An antenna in each of NFC and WPC systems includes a coil having a predetermined area and receives energy required for an operation of a micro-chip from a reader.

A magnetic field is formed by alternating current (AC) power energy generated in a primary coil, current is induced by the AC power energy flowing through the coil of the antenna, and a voltage is generated due to an inductance of the antenna. The voltage generated in this way is used as power for data transmission or to charge a battery.

However, according to the related art, a receiver that is a secondary coil includes a coil on a soft magnetic layer, and heat is generated by the coil and the soft magnetic layer when the current is induced on the coil. Thus, a scheme for efficiently dissipating heat is necessary.

DISCLOSURE

Technical Problem

The present invention is directed to maximizing a contact surface area by including an uneven pattern between a heat dissipation layer and a soft magnetic layer so that an adhesive force between the heat dissipation layer and the soft magnetic layer can be improved and heat generated in a coil pattern and the soft magnetic layer can be more efficiently dissipated to the outside through the heat dissipation layer.

The present invention is also directed to using a housing of a battery as a heat dissipation layer so that electromagnetic interference between a soft magnetic layer and the battery can be suppressed through an uneven pattern between the heat dissipation layer and the soft magnetic layer and high permeability is maintained so that charging efficiency from a transmitter to a receiver can be further improved.

Technical Solution

One aspect of the present invention provides a wireless charging board including: a coil pattern; a soft magnetic layer having one side on which the coil pattern is disposed; and a heat dissipation layer disposed on the other side of the soft magnetic layer and including a first uneven pattern portion.

Advantageous Effects

According to an embodiment of the present invention, an uneven pattern is included between a heat dissipation layer and a soft magnetic layer so that a contact surface area can be maximized and an adhesive force between the heat dissipation layer and the soft magnetic layer can be improved and heat generated in a coil pattern and the soft magnetic layer can be more efficiently dissipated to the outside through the heat dissipation layer.

In addition, according to an embodiment of the present invention, a housing of a battery is used as the heat dissipation layer so that electromagnetic interference between the soft magnetic layer and the battery can be suppressed through the uneven pattern between the heat dissipation layer and the soft magnetic layer and high permeability is maintained so that charging efficiency from a transmitter to a receiver can be further improved.

MODES OF THE INVENTION

Figure 1:
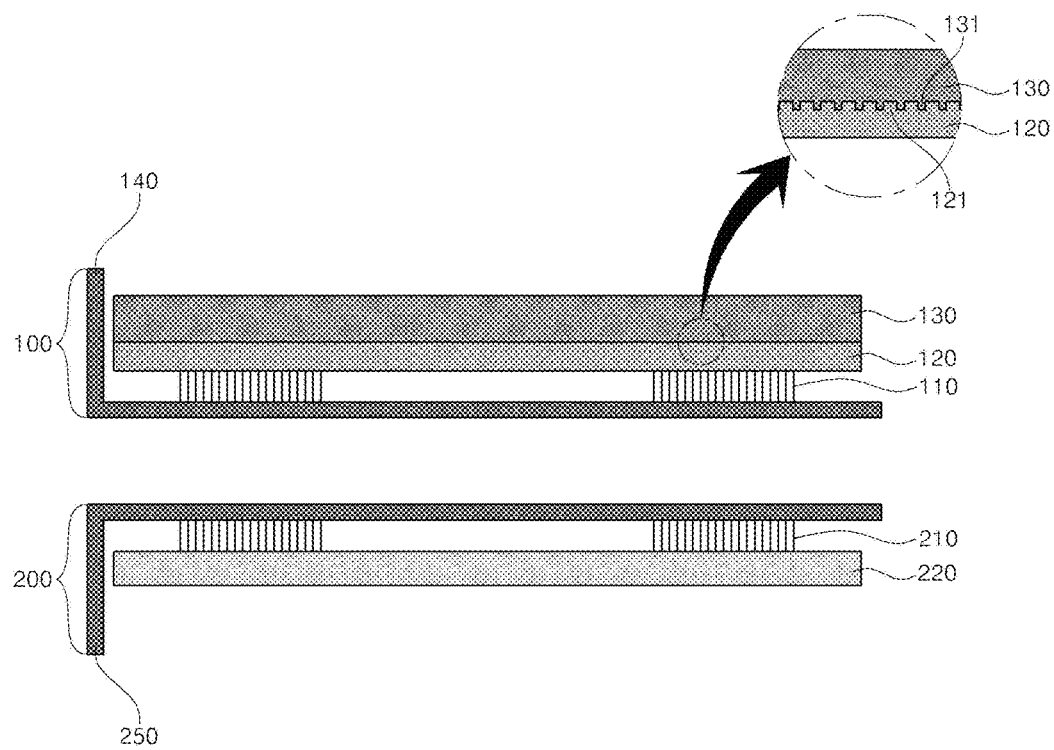
FIG. 1 is a cross-sectional view of a wireless power conversion (WPC) system according to an embodiment of the present invention.

Hereinafter, exemplary embodiments of the present invention will be described in detail. However, when it is determined that a detailed description of well-known functions or configurations related to the invention unnecessarily obscures the subject matter of the invention in the description of embodiments, the detailed description will be omitted. Also, sizes of elements in the drawings may be exaggerated for explanation and do not refer to actually-applied sizes.

FIG. 1 is a cross-sectional view of a wireless power conversion (WPC) system according to an embodiment of the present invention.

A wireless charging device and a wireless charging board according to an embodiment of the present invention will be described with reference to FIG. 1.

As illustrated in FIG. 1, the WPC system according to an embodiment of the present invention includes a transmitter 200 and a receiver 100. Each of the transmitter 200 and the receiver 100 may be a wireless charging device according to an embodiment of the present invention.

Each of the transmitter 200 and the receiver 100 includes coil patterns 110 and 210. When power is supplied to the coil pattern 210 of the transmitter 200 and an alternating current (AC) flows through the coil pattern 210, an AC is induced in the coil pattern 110 of the receiver 100 that is physically separated from the transmitter 200 due to electromagnetic induction.

Charging of a battery (not shown) can be performed using the AC induced in the receiver 100.

Meanwhile, in the case of the WPC system, the transmitter 200 may be a transmission pad and the receiver 100 may be part of a portable mobile terminal device, a home/personal electronic product, a transportation unit, or the like to which a WPC technology is applied.

Also, the portable mobile terminal device, the home/personal electronic product, the transportation unit, or the like to which the WPC technology is applied may include only the receiver 100 or both the transmitter 200 and the receiver 110.

Also, in the case of a near field communication (NFC) system, the transmitter 200 may be a reader and the receiver 100 may be a tag.

Meanwhile, the transmitter 200 may include a soft magnetic layer 220 and the coil pattern 210, which are disposed in a housing 250.

Also, the receiver 100 includes a wireless charging board accommodated in a housing 140, and the wireless charging board includes the coil pattern 110, a soft magnetic layer 120, and a heat dissipation layer 130.

The coil pattern 110 may be configured using a coil on the soft magnetic layer 120. In this case, the coil pattern 110 may have a shape in which a coil is wound 3 or 4 turns. The soft magnetic layer 120 has one side on which the coil pattern 110 is disposed and the other side on which the heat dissipation layer 130 is disposed.

In this case, the soft magnetic layer 120 may be one selected from the group consisting of an amorphous alloy ribbon, a nanocrystalline ribbon, and a silicon steel plate.

The heat dissipation layer 130 according to an embodiment of the present invention dissipates heat generated in the coil pattern 110, the soft magnetic layer 120, and a battery (not shown).

The heat dissipation layer 130 may be a housing of the battery. Metal materials including at least one selected from the group consisting of nickel (Ni), iron (Fe), aluminum (Al), copper (Cu), tin (Sn), zinc (Zn), tungsten (W), and silver (Ag) may be used to form the heat dissipation layer 130.

A first uneven pattern portion 131 is included in the heat dissipation layer 130 having the above configuration.

In this case, a second uneven pattern portion 121 corresponding to the first uneven pattern portion 131 may be formed on the soft magnetic layer 120 due to the first uneven pattern portion 131 of the heat dissipation layer 130.

Meanwhile, a cross-section of at least one of the first uneven pattern portion 131 and the second uneven pattern portion 121 may have various shapes including a circular shape, a polygonal shape, or the like.

The first uneven pattern portion 131 has a configuration for maximizing a contact surface area between the heat dissipation layer 130 and the soft magnetic layer 120. When the first uneven pattern portion 131 is formed in the heat dissipation layer 130 as described above, an adhesive force between the heat dissipation layer 130 and the soft magnetic layer 120 may be improved, and heat generated in the soft magnetic layer 120 may be more efficiently discharged to the outside through the heat dissipation layer 130.

Also, as in an embodiment of the present invention, when the first uneven pattern portion 131 is formed in the heat dissipation layer 130 and is coupled to the first soft magnetic layer 120 and the heat dissipation layer 130 is a housing of the battery, electromagnetic interference between the first soft magnetic layer 120 and the battery may be suppressed and high permeability is maintained so that charging efficiency between the transmitter 200 and the receiver 100 may be further improved.

Figure 2:
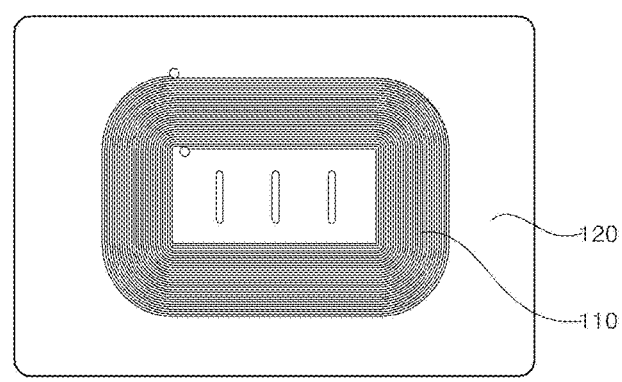
FIG. 2 is a top view of a wireless charging board according to an embodiment of the present invention.

FIG. 2 is a top view of a wireless charging board according to an embodiment of the present invention.

As illustrated in FIG. 2, the coil pattern 110 is formed on one side of the soft magnetic layer 120.

The soft magnetic layer 120 may be formed of a metal material or a ferrite material. The soft magnetic layer 120 may be implemented in various shapes including a pellet, a plate, a ribbon, a foil, and a film, and may also be formed of ferrite including at least one selected from the group consisting of Fe, Ni, cobalt (Co), manganese (Mn), Al, Zn, Cu, barium (Ba), titanium (Ti), Sn, strontium (Sr), phosphorous (P), boron (B), nitrogen (N), carbon (C), W, chromium (Cr), bismuth (Bi), lithium (Li), yttrium (Y), and cadmium (Cd).

In more detail, the soft magnetic layer 120 may have the form of a composite including a single metal or an alloy powder flake including at least one of Fe, Co, and Ni and a polymer resin, an alloy ribbon, a stacked ribbon, a foil, or a film including at least one of Fe, Co, and Ni. Also, the soft magnetic layer 120 may include a composite including 90 wt % or more of FeSiCr flakes and 10 wt % or less of a polymer resin, a sheet including a Ni—Zn-based ferrite, a ribbon, a foil, or a film.

The coil pattern 110 is disposed on the soft magnetic layer 120 having the above configuration.

The coil pattern 110 may have a shape of a coil wound on the surface of the soft magnetic layer 120.

For example, when the coil pattern 110 is a reception antenna applied to a smartphone, it may have a shape of a spiral coil having an outer diameter of 50 mm or less and an inner diameter of 20 mm or more.

FIGS. 3 through 8 are cross-sectional views of an uneven pattern portion according to various embodiments of the present invention formed between a heat dissipation layer and a soft magnetic layer.

Subsequently, a configuration of the first uneven pattern portion 131 of the heat dissipation layer 130 and the second uneven pattern portion 121 of the soft magnetic layer 120 according to various embodiments of the present invention will be described with reference to FIGS. 3 through 8.

In more detail, the first uneven pattern portion 131 is formed on a side of the heat dissipation layer 130 that contacts the soft magnetic layer 120.

Figure 3:
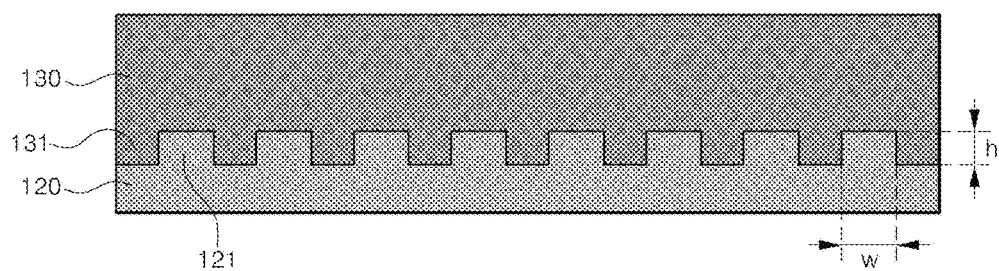
FIGS. 3 through 8 are cross-sectional views of an uneven pattern portion formed between a heat dissipation layer and a soft magnetic layer according to various embodiments of the present invention.

The first uneven pattern portion 131 may be disposed in a partial region or on an entire surface of the heat dissipation layer and may be attached to the heat dissipation layer 130 using an additional member. In the current embodiment, the surface of the heat dissipation layer is directly treated so that the heat dissipation layer may include embossed patterns and engraved patterns. That is, the first uneven pattern portion may be implemented as a structure in which embossed patterns and engraved patterns are mixed with each other on the surface of the heat dissipation layer as illustrated in FIG. 3. Furthermore, cross-sectional shapes of the embossed patterns and the engraved patterns may also be the same. In particular, in an embodiment of the present invention, in this case, the first uneven pattern portion may be implemented as a structure in which the embossed patterns and the engraved patterns are adjacent to each other and are alternately disposed so that uniform stress and an adhesive force can be applied to a bonded surface and thus a bonding strength may be strengthened as in the structures of FIGS. 3 and 4.

In more detail, the first uneven pattern portion 131 may be formed on a side of the heat dissipation layer 130 that contacts the soft magnetic layer 120, and the second uneven pattern portion 121 having a shape of a pattern corresponding to the first uneven pattern portion 131 may be formed on the soft magnetic layer 120 due to the first uneven pattern portion 131.

In the embodiment of the present invention illustrated in FIG. 3, a cross-section of each pattern of the first uneven pattern portion 131 of the heat dissipation layer 130 may protrude in a rectangular shape. Thus, a cross-section of each pattern of the second uneven pattern portion 121 of the first soft magnetic layer 120 may also protrude in a rectangular shape corresponding to the first uneven pattern portion 131.

In this case, a height h of the pattern included in one of the first uneven pattern portion 131 and the second uneven pattern portion 121 may be 2 to 200 μm, and a width w of the pattern may be 2 to 200 μm.

As in an embodiment of the present invention, when the height h or width w of the pattern is 2 to 200 μm, a contact surface area of the first uneven pattern portion 131 or the second uneven pattern portion 121 may be maximized so that an adhesive force between the heat dissipation layer 130 and the soft magnetic layer 120 may be maximized and heat generated in the coil pattern 110 and the first soft magnetic layer 120 may be more efficiently discharged to the outside through the heat dissipation layer 130.

Meanwhile, when the height h or width w of the pattern is 2 μm or less, manufacturing costs increase and the adhesive force is lowered. When the height h or width w of the pattern exceeds 200 μm, the adhesive force between the first uneven pattern portion 131 and the second uneven pattern portion 121 may be deteriorated.

However, when the height h or width w of the pattern is 2 to 200 μm as in an embodiment of the present invention, the adhesive force between the heat dissipation layer 130 and the first soft magnetic layer 120 may be increased and a heat dissipation effect may be maximized. Also, when the heat dissipation layer 130 is a housing of a battery, electromagnetic interference between the first soft magnetic layer 120 and the battery may be suppressed and high permeability is maintained so that charging efficiency between a transmitter and a receiver may be further improved.

Figure 4:
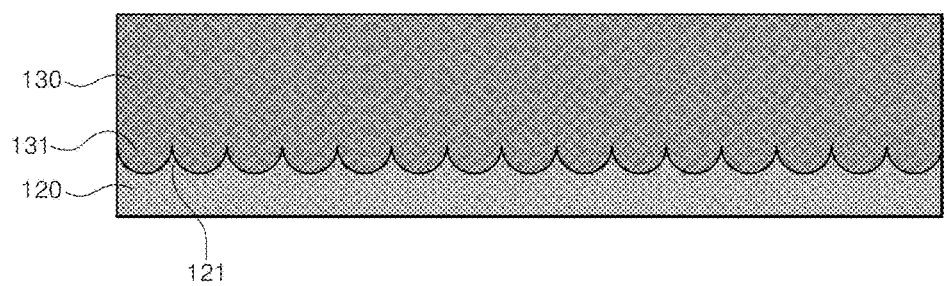
Figure 5:
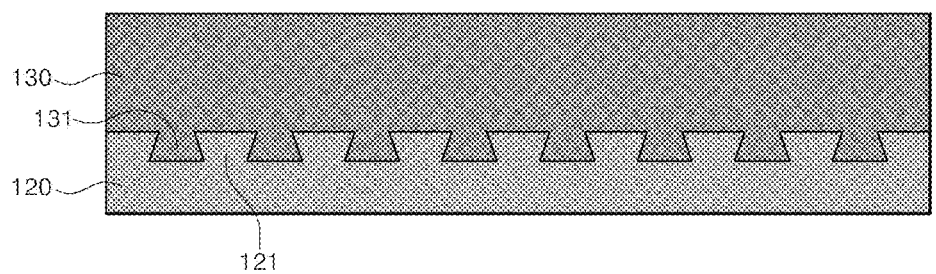

In the embodiment of the present invention illustrated in FIG. 4, a cross-section of each pattern of the first uneven pattern portion 131 of the heat dissipation layer 130 is configured as a rounded protrusion structure. Thus, a cross-section of each pattern of the second uneven pattern portion 121 of the first soft magnetic layer 120 may also be configured as a spire shape corresponding to the first uneven pattern portion 131.

Furthermore, in another aspect of the embodiment of the present invention, a width of a top surface of each of the embossed patterns may be greater than a width of a bottom surface of each of the embossed patterns. Alternatively, the width of the bottom surface of each embossed pattern may be greater than the width of the top surface of each embossed pattern. In such a case, referring to FIG. 5, a cross-section of each pattern of the first uneven pattern portion 131 of the heat dissipation layer 130 has a protruding structure of an inverted trapezoid. Thus, a cross-section of each pattern of the second uneven pattern portion 121 of the first soft magnetic layer 120 may have an inverted trapezoidal shape corresponding to the first uneven pattern portion 131. Through this structure, in particular, a coupling force in a coupling structure of the soft magnetic layer and the heat dissipation layer is strengthened so that reliability of coupling may be improved. Of course, even in this case, due to an alternating arrangement of the embossed patterns and the engraved patterns, a coupling force on an entire coupling surface on which patterns are formed is uniformly formed so that non-uniformity of stress distribution may be eliminated.

Figure 6:
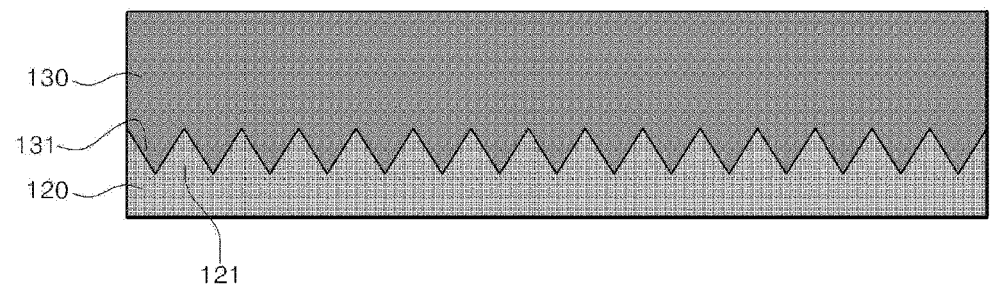

In the embodiment of the present invention illustrated in FIG. 6, the cross-section of each pattern of the first uneven pattern portion 131 of the heat dissipation layer 130 has a triangular protrusion structure. Thus, a cross-section of each pattern of the second uneven pattern portion 121 of the first soft magnetic layer 120 may also have a triangular shape corresponding to the first uneven pattern portion 131.

Figure 7:
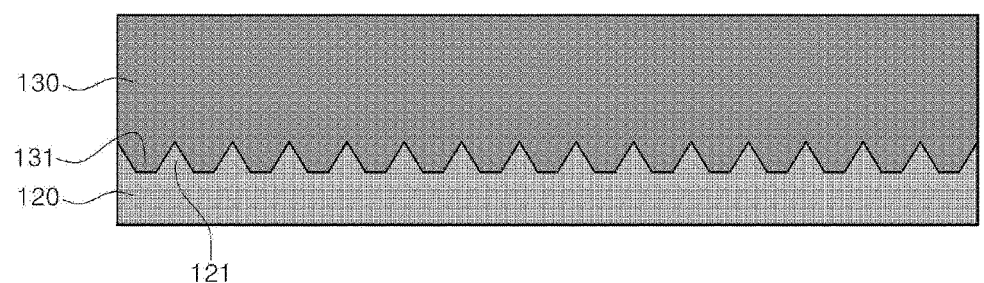

In the embodiment of the present invention illustrated in FIG. 7, shapes of cross-sections of the embossed patterns and the engraved patterns are different from each other. That is, the cross-sectional embossed patterns and engraved patterns are alternately disposed. The cross-section of each pattern of the first uneven pattern portion 131 of the heat dissipation layer 130 has a trapezoidal protrusion structure. Thus, the cross-section of each pattern of the second uneven pattern portion 121 of the first soft magnetic layer 120 may have a triangular shape corresponding to the first uneven pattern portion 131.

The above-described first uneven pattern portions and second uneven pattern portions having various shapes of FIGS. 4 through 7 may be implemented as engraved and embossed patterns. In particular, shapes or widths of the embossed patterns and the engraved patterns may be formed to be the same. Due to the same shapes and widths, uniformity of a coupling force on each bonded surface is secured so that a warping phenomenon during bonding may be prevented.

Figure 8:
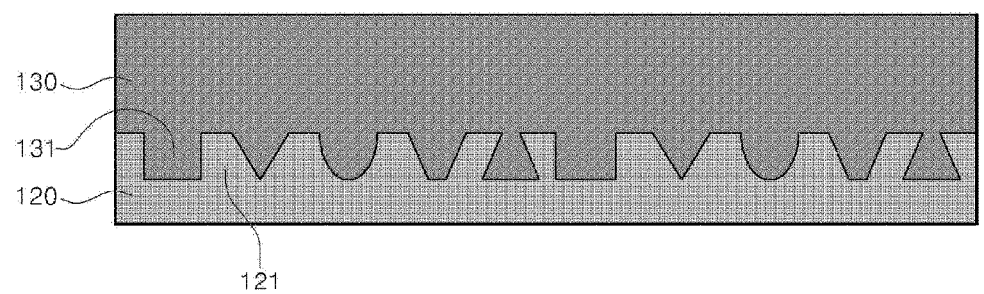

In the embodiment of the present invention illustrated in FIG. 8, a cross-section of each pattern of the first uneven pattern portion 131 of the heat dissipation layer 130 may have a complicated protrusion structure or a random protrusion structure of various polygonal patterns. Thus, the cross-section of each pattern of the second uneven pattern portion 121 of the first soft magnetic layer 120 may have a shape corresponding to the first uneven pattern portion 131.

As in the embodiment of FIG. 7 or 8, when the pattern of the first uneven pattern portion 131 of the heat dissipation layer 130 and the pattern of the second uneven pattern portion 121 of the soft magnetic layer 120 are different from each other, an adhesive force between the heat dissipation layer 130 and the soft magnetic layer 120 may be further improved.

Thus, according to an embodiment of the present invention, the uneven pattern portions 131 and 121 are included between the heat dissipation layer 130 and the soft magnetic layer 120 so that a contact surface area can be maximized, the adhesive force between the heat dissipation layer 130 and the soft magnetic layer 120 can be improved, and heat generated in the first coil pattern 110 and the first soft magnetic layer 120 can be more efficiently dissipated to the outside through the heat dissipation layer 130.

Also, according to an embodiment of the present invention, a housing of a battery is used as the heat dissipation layer 130 so that, through the uneven pattern portions between the heat dissipation layer 130 and the soft magnetic layer 120, electromagnetic interference between the soft magnetic layer 120 and the battery can be suppressed, high permeability can be maintained, and charging efficiency from the transmitter 200 to the receiver 100 can be further improved.

While the invention has been shown and described with reference to certain exemplary embodiments thereof, it should be understood by those skilled in the art that various changes in form and details may be made therein without departing from the spirit and scope of the invention as defined by the appended claims.

The invention claimed is:

1. A wireless charging board comprising:
a soft magnetic layer having a first surface and a second surface opposite to the first surface;
a coil pattern disposed on the first surface of the soft magnetic layer; and
a heat dissipation layer disposed on the second surface of the soft magnetic layer,
wherein the heat dissipation layer is in direct physical contact with the second surface of the soft magnetic layer such that the coil pattern, the soft magnetic layer, and the heat dissipation layer are stacked in series,
wherein a first uneven pattern portion is formed on a surface of the heat dissipation layer that is in direct physical contact with the second surface of the soft magnetic layer,
wherein a second uneven pattern portion is formed on the second surface of the soft magnetic layer, and
wherein a surface of the first uneven pattern portion and a surface of the second uneven pattern portion are in direct contact with each other.

2. The wireless charging board of claim 1, wherein the first uneven pattern portion is disposed in a partial region or on an entire surface of the heat dissipation layer.

3. The wireless charging board of claim 2, wherein the first uneven pattern portion is directly formed on the surface of the heat dissipation layer.

4. The wireless charging board of claim 3, wherein the first uneven pattern portion has a structure in which embossed patterns and engraved patterns are mixed on the surface of the heat dissipation layer.

5. The wireless charging board of claim 4, wherein cross-sectional shapes of the embossed patterns and the engraved patterns of the first uneven pattern portion are same.

6. The wireless charging board of claim 5, wherein the first uneven pattern portion has a structure in which the embossed patterns and the engraved patterns are alternately disposed adjacent to each other.

7. The wireless charging board of claim 4, wherein a width of a top surface of each of the embossed patterns is greater than a width of a bottom surface of each of the embossed patterns.

8. The wireless charging board of claim 4, wherein a width of a bottom surface of each of the engraved patterns is greater than a width of a top surface of each of the engraved patterns.

9. The wireless charging board of claim 4, wherein each of the embossed patterns and the engraved patterns has a height of 2 to 200 μm.

10. The wireless charging board of claim 5, wherein a width of each of the embossed patterns and a width of each of the engraved patterns are the same.

11. The wireless charging board of claim 10, wherein each of the embossed patterns and the engraved patterns has a width of 2 to 200 μm.

12. The wireless charging board of claim 4, wherein cross-sectional shapes of the embossed patterns and the engraved patterns are different from each other.

13. The wireless charging board of claim 4, wherein the embossed patterns and the engraved patterns having different cross-sectional shapes are alternately disposed.

14. The wireless charging board of claim 1, wherein a cross-section of at least one of the first uneven pattern portion and the second uneven pattern portion comprises at least one pattern among circular and polygonal patterns.

15. The wireless charging board of claim 4, wherein the soft magnetic layer is formed of one selected from a group consisting of an amorphous alloy, a crystalline alloy, an amorphous alloy ribbon, a nanocrystalline ribbon, and a silicon steel plate.

16. The wireless charging board of claim 4, wherein the heat dissipation layer comprises a metal material.

17. The wireless charging board of claim 16, wherein the metal material comprises at least one among nickel (Ni), iron (Fe), aluminum (Al), copper (Cu), tin (Sri), zinc (Zn), tungsten (W), and silver (Ag).

18. A wireless charging device comprising the wireless charging board of claim 1.

19. The wireless charging board of claim 1, wherein the surface of the first uneven pattern portion is engaged with the surface of the second uneven pattern portion.

20. The wireless charging board of claim 1, wherein the first uneven pattern portion is mated with the second uneven pattern portion.

* * * * *